(12) United States Patent  (10) Patent No.: US 8,511,438 B1
Waldschmitt  (45) Date of Patent: Aug. 20, 2013

(54) LIFTING AND LOWERING DEVICE AND SYSTEM

(76) Inventor: Daniel Wayne Waldschmitt, Napa, CA (US)

(*) Notice: Subject to any disclaimer, the term of this patent is extended or adjusted under 35 U.S.C. 154(b) by 678 days.

(21) Appl. No.: 12/460,512

(22) Filed: Jul. 20, 2009

(51) Int. Cl.
*B65H 59/16* (2006.01)

(52) U.S. Cl.
USPC .......................................... 188/65.2

(58) Field of Classification Search
USPC ............. 188/65.2, 65.1, 65.4, 65.5; 482/114, 482/120; 182/235, 42, 5, 6, 9; 254/4 R, 254/270, 271, 272
See application file for complete search history.

(56) References Cited

U.S. PATENT DOCUMENTS

| | | | | |
|---|---|---|---|---|
| 3,606,323 A * | 9/1971 | Ottaviani | ....................... | 482/120 |
| 3,650,531 A * | 3/1972 | Pridham | ....................... | 482/120 |
| 3,656,745 A * | 4/1972 | Holkesvick | ................... | 482/120 |
| 4,343,466 A * | 8/1982 | Evans | ........................... | 482/120 |
| 4,466,612 A * | 8/1984 | Marczewski | .................. | 482/120 |
| 5,145,036 A * | 9/1992 | Omalia | ......................... | 188/65.5 |
| 5,330,120 A * | 7/1994 | Tussing | ....................... | 242/588.2 |
| 5,352,172 A * | 10/1994 | Suzaki | .......................... | 482/120 |
| 5,467,845 A * | 11/1995 | Scruggs | ...................... | 188/65.2 |
| 6,494,477 B1 * | 12/2002 | Parker | ......................... | 280/479.1 |
| 7,291,099 B1 * | 11/2007 | Marczewski | .................. | 482/114 |
| 7,530,523 B1 * | 5/2009 | Murray | ......................... | 242/557 |

* cited by examiner

*Primary Examiner* — Xuan Lan Nguyen
(74) *Attorney, Agent, or Firm* — Risto A. Rinne, Jr.

(57) ABSTRACT

An apparatus for the controlled descent or lifting of objects includes a main longitudinal member that is attached at one end thereof to a receiver hitch. A plurality of spaced-apart side extensions of round material stock extend from opposite sides of the main longitudinal member and, together with a nose portion, provide locations that an operator can accomplish multiple wraps with a rope of a block and tackle to vary the friction between the rope and the apparatus sufficient to minimize a magnitude of resistance that is exerted by an operator to the rope to control the rate of descent of the object. The descent rate of heavy objects, such as severed tree limbs, can be easily and safely controlled. By securing the rope to the apparatus and driving a vehicle that the receiver hitch is attached to forward, the apparatus can be used to lift heavy objects.

17 Claims, 5 Drawing Sheets

LIFTING AND LOWERING DEVICE AND SYSTEM

BACKGROUND OF THE INVENTION

1. Field of the Invention

The present invention, in general, relates to lifting and lowering heavy objects and, more particularly, to a device for lifting and lowering tree limbs.

Trees sometimes require the removal of troublesome limbs that pose a threat to property disposed below the limbs. Sometimes, an entire tree will require removal for a wide range of possible reasons. Sometimes, the mere positioning of the tree can pose a threat to people or pets, livestock, personal property, power, cable, or telephone lines, commercial or residential property or interests, traffic, adjoining property, etc. Sometimes, insects, lightning strikes, fire, or disease will have weakened the tree to the point of instability. Sometimes, the tree will need to be removed to facilitate access to an area or for purely aesthetic reasons. These, and numerous other reasons, require the removal of trees and tree limbs.

In developed areas it is usually not feasible or safe to simple cut and fell the tree because it may fall in an undesirable or unpredictable manner and cause property damage or even loss of life. Often, there is simply no space available to permit a normal felling of the tree. In such a situation an arborist or commercial tree service is usually contracted to safely remove the tree or certain of its limbs. For the purpose of consistency, the term "arborist", as used herein, refers to anyone having knowledge in the tree maintenance and/or tree or limb removal art, including any of the crew that may be employed by the various commercial tree service companies.

It is common practice for the arborist to prune and remove unwanted tree limbs as well as to remove unwanted trees. This work is often performed in tight quarters and with limited access. If possible, a vehicle with equipment is brought into the area.

The removal process is typically accomplished by a process that is well known in the arbor field. A block and tackle is employed with a pulley of the block and tackle firmly anchored to an overhead limb of the tree that is to have certain of its limbs removed and, possibly, to have the entire tree removed. The use of a block and tackle is done to provide a way to control the rate of descent of each limb that is severed. It may also provide a mechanical advantage. If a hoist is available (sometimes called a "cherry picker") it is used to elevate the worker safely to the overhead limb. The worker then secures the pulley to the overhead limb. A rope is used as part of the block and tackle. The rope passes over the pulley.

The worker then secures an upper first end of the rope to the limb that is to be severed. The rope is commonly set to pass around a circumference of the limb and is secured to itself by use of a knot, if desired. Another common way of securing the rope in a tightened (or desired position) is by use of a device intended for that purpose. The device, which is well known in the arbor art, may be secured where desired at a location that is near the first end of the rope. The first end of the rope passes through the device.

The device allows tightening of the rope by pulling the first end through the device. The device includes a pivoting member that pivots in a first direction when pulling the rope in a first direction through the device that allows for easy passage of the rope through the device. When the worker releases tension on the first end of the rope, the rope is urged through by the force exerted from the load in a second direction through the device that is opposite that of the first direction through the device.

Motion by the rope in the second direction bears on the pivoting member and urges the pivoting member in an opposite second direction that causes the pivoting member to increasingly bear upon the rope and bind (i.e., pinch) the rope to the device. Frictional engagement between the rope and the pivoting member and interior of the device ensure that the rope will remain secured at approximately the same position it was located when the worker released pressure from the first end of the rope.

The device allows the rope to easily pass through the device in the first direction and prevents its passing in the second direction. The device provides a safe, secure, and rapid way to tighten the rope around the limb. A manual release on the device allows the rope to pass through the device in the second direction, when desired.

Other methods of securing the first end of the rope to the limb are also available to the arborist. For example, the first end of the rope may be secured to a cable that extends around the limb. The cable is configured to include two loops at opposite ends, thereof. A first of the two loops is allowed to pass around the circumference of the limb and through the opposite second loop. The first end of the rope is then affixed to the first loop by a snap ring or other fastening device or method.

As the weight of the limb bears on cable and the rope, the first loop is increasingly pulled through the second loop, thereby causing the cable to self-tighten around the limb. This provides a secure attachment of the limb to the rope.

Typically, an attempt is made by the worker to secure first end of the rope to the limb at a location that is believed to be near a center of gravity of the limb. This is accomplished to prevent an excessive rotational force from occurring that would otherwise pivot the limb, after its severing, into a more vertical position. Supporting the severed limb proximate its center of gravity provides better control for controlling the position of the limb during its descent.

Before cutting the limb, a lower second end of the rope that descends to the ground is secured and excessive slack in the rope is removed. Typically, for safety reasons, a first ground operator will stand at a remote location that is sufficiently offset from a plumb line extending down from the limb. Standing at the remote location prevents injury from occurring to the first ground operator in the unlikely event that the limb should fall suddenly to the ground.

From the remote location the first ground operator is also better able to observe and control the limb during its descent. At times, a second ground operator is used to displace the limb away from plumb (i.e., as in a plumb line) as it is being lowered. The second ground operator uses additional ropes or long poles to urge the limb in the desired direction of offset from plumb as it is being lowered. The second ground operator does not stand directly under the limb although the second ground operator may stand closer to plumb than does the first ground operator. This is discussed in greater detail below.

From the remote location, the first ground operator is better able to observe the actions of the second ground operator during descent of the limb and comply with instructions that are provided by the second ground operator.

Often, the limb may weigh several hundreds of pounds or even more. If the rope passes once over a single pulley, as is common, the force exerted on the rope by the weight of the limb cannot be offset by the weight or strength of the first ground operator. Therefore, some method must be provided to allow the first ground operator to control the limb's rate of decent.

Many devices have been provided to satisfy this need, some of which include winches or other devices intended to supply a mechanical advantage. However, such solutions tend to be expensive to purchase and they are also time consuming to set up prior to use. They also must be anchored to an object that is sufficiently strong and heavy so as to be to be able to compensate for the weight of the limb. Also, these types of prior art devices typically operate very slowly and this can impede progress in circumstances where a number of limbs can be safely lowered at a higher rate of speed.

Other, more simple devices intended to assist the first ground operator in the safe and controlled lowering of the limb rely on wrapping the rope repeatedly around a spool, adjacent tree, or object as a means of applying and controlling friction between the rope and device, tree, or object. However, these types of devices do not permit lifting of the limb which is sometimes required. This is further discussed below.

As briefly mentioned above, sometimes it is undesirable to allow the limb to descend straight down. It is necessary to offset a descending limb from plumb when an important or fragile object that is difficult or impossible to remove is located below the limb that is to be severed. As mentioned, secondary ropes, poles, or other devices intended to deflect the path of descent are used to guide the descending limb to a location that is offset with respect to plumb.

Sometimes, during descent it becomes apparent that the current degree of deflection experienced by limb will be insufficient. When this occurs it becomes necessary to again raise the limb to a higher elevation and repeat the descent process while applying a different amount of deflection to the limb.

If a prior art type of friction-based limb lowering device is used then it is not possible to raise the limb.

Also, there is a need to be able to secure a limb lowering device quickly and at various anchor points around the tree. This would provide the ground operator with an ability to stand at various locations during lowering of different limbs with each location having a particular advantage. However, prior art devices have been difficult and time-consuming to secure to a location and the number of locations available for anchoring the prior art devices have been severely limited.

Accordingly, there exists today a need for a lifting and lowering device and system that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

Clearly, such an apparatus and system would be useful and desirable.

2. Description of Prior Art

Limb lowering devices are, in general, known. For example, the following patents describe various types of these devices, some of which may have relevance as well as others which may not have particular relevance to the invention. These patents are cited not as an admission of their having any particular relevance to the invention but rather to present a broad and diversified understanding regarding the current state of the art appertaining to either the field of the invention or possibly to other related or distal fields of invention.

U.S. Pat. No. 7,007,927 to Halas, that issued on Mar. 7, 2006;
U.S. Pat. No. 6,631,885 to Halas, that issued on Oct. 14, 2003;
U.S. Pat. No. 6,578,823 to Johnson, that issued on Jun. 17, 2003;
U.S. Pat. No. 5,971,363 to Good, that issued on Oct. 26, 1999;
U.S. Pat. No. 5,484,253 to Johnson, that issued on Jan. 16, 1996;
U.S. Pat. No. 5,467,845 to Scruggs, that issued on Nov. 21, 1995;
U.S. Pat. No. 5,395,284 to Frisk, that issued on Mar. 7, 1995;
U.S. Pat. No. 5,352,172 to Suzaki, that issued on Oct. 4, 1994;
U.S. Pat. No. 4,899,680 to Russell, Jr., that issued on Feb. 13, 1990;
U.S. Pat. No. 4,314,693 to Hobbs, that issued on Feb. 9, 1982;
U.S. Pat. No. 4,239,188 to Hobbs, that issued on Dec. 16, 1980;
U.S. Pat. No. 3,116,049 to Stranahan, that issued on Dec. 31, 1963;
U.S. Pat. No. 2,441,336 to Sova, that issued on May 11, 1948;
U.S. Pat. No. 2,235,302 to Stillwagon, that issued on Mar. 18, 1941; and
U.S. Pat. No. 904,747 to Anderson, that issued on Nov. 24, 1908.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a lifting and lowering device that is easy to manufacture.

It is also an important object of the invention to provide a lifting and lowering device that is easy to use.

Another object of the invention is to provide a lifting and lowering device that permits an operator to safely control the descent of an object.

Still another object of the invention is to provide a lifting and lowering device that permits an operator to safely control the descent of a heavy object, such as a severed branch or limb of a tree.

Still yet another object of the invention is to provide a lifting and lowering device that includes a plurality of remote receivers that can be permanently attached to or detachably attached to equipment and objects near a work site, and wherein a lifting and lowering device can be detachably-attached to any of the receivers.

Yet another important object of the invention is to provide a lifting and lowering device that can be used to lower an object slowly to the ground.

Still yet another important object of the invention is to provide a lifting and lowering device that can be used to raise an object away from the ground.

A first continuing object of the invention is to provide a lifting and lowering device that provides a way to vary the friction between a rope and the device to permit an operator to exert a minimal amount of force to a rope in order to prevent an object that is attached to the rope from descending toward the ground surface.

A second continuing object of the invention is to provide a lifting and lowering device that is able to orient itself so that a center longitudinal axis of the device is able to automatically orient itself and point in a direction that is in alignment with an axis of a rope that is used with the device when the rope is applying a force to the device that is tending to lift the device above a horizontal plane.

A third continuing object of the invention is to provide a lifting and lowering device that is able to orient itself so that a center longitudinal axis of the device is able to automatically orient itself and point in a direction that is in alignment with an axis of a rope that is used with the device when the rope is applying a force to the device that is tending to lift the device above a horizontal plane, and wherein the device does not descend below a plane that is approximately equal to a plane of a receiver hitch that the device is attached to when no force that is attempting to lift the device is present.

A fourth continuing object of the invention is to provide a lifting and lowering device that is able to orient itself so that a center longitudinal axis of the device is able to automatically orient itself and point in a direction that is in alignment with an axis of a rope that is used with the device when the rope is applying a force to the device that is tending to lift the device above a horizontal plane, and wherein the center longitudinal axis of the device is able to align substantially with a center longitudinal axis of a receiver hitch that the device is attached to when no force that is attempting to lift the device is present.

Briefly, a lifting and lowering device that is constructed in accordance with the principles of the present invention has a main longitudinal member to which a plurality of side extensions are attached at spaced apart intervals. The main longitudinal member is detachably-attachable with respect to a receiver hitch of a vehicle by insertion of hitch pin that passes through a receiver hitch opening in the receiver hitch and a corresponding hitch pin opening that is provided through a distal end of the main longitudinal member that aligns with the receiver hitch opening. A nose section is attached to or near an opposite end of the main longitudinal member. The side extensions each include a longitudinal axis that is generally parallel with respect to a center longitudinal axis of the hitch pin. The nose extension preferably includes at least a portion thereof that is disposed on each side of a longitudinal axis of the main longitudinal member which extends rearward toward the bottom end for a predetermined distance. The lifting and lowering device is used in conjunction with a block and tackle to safely and controllably lower severed limbs by passing a distal end of a rope of the block and tackle around the nose section or nose extension and around or by as many of the side extensions, as required, to provide sufficient friction to permit an operator to slowly lower the limb and to stop descent of the limb, when desired. If desired, one or more optional remote receivers are attached where desired to equipment or to any possible object such as a tractor or a tree to provide a location for attaching the device that is optimally located with respect to the limb. A first and second modified version are also described.

DETAILED DESCRIPTION OF THE INVENTION

Figure 1:
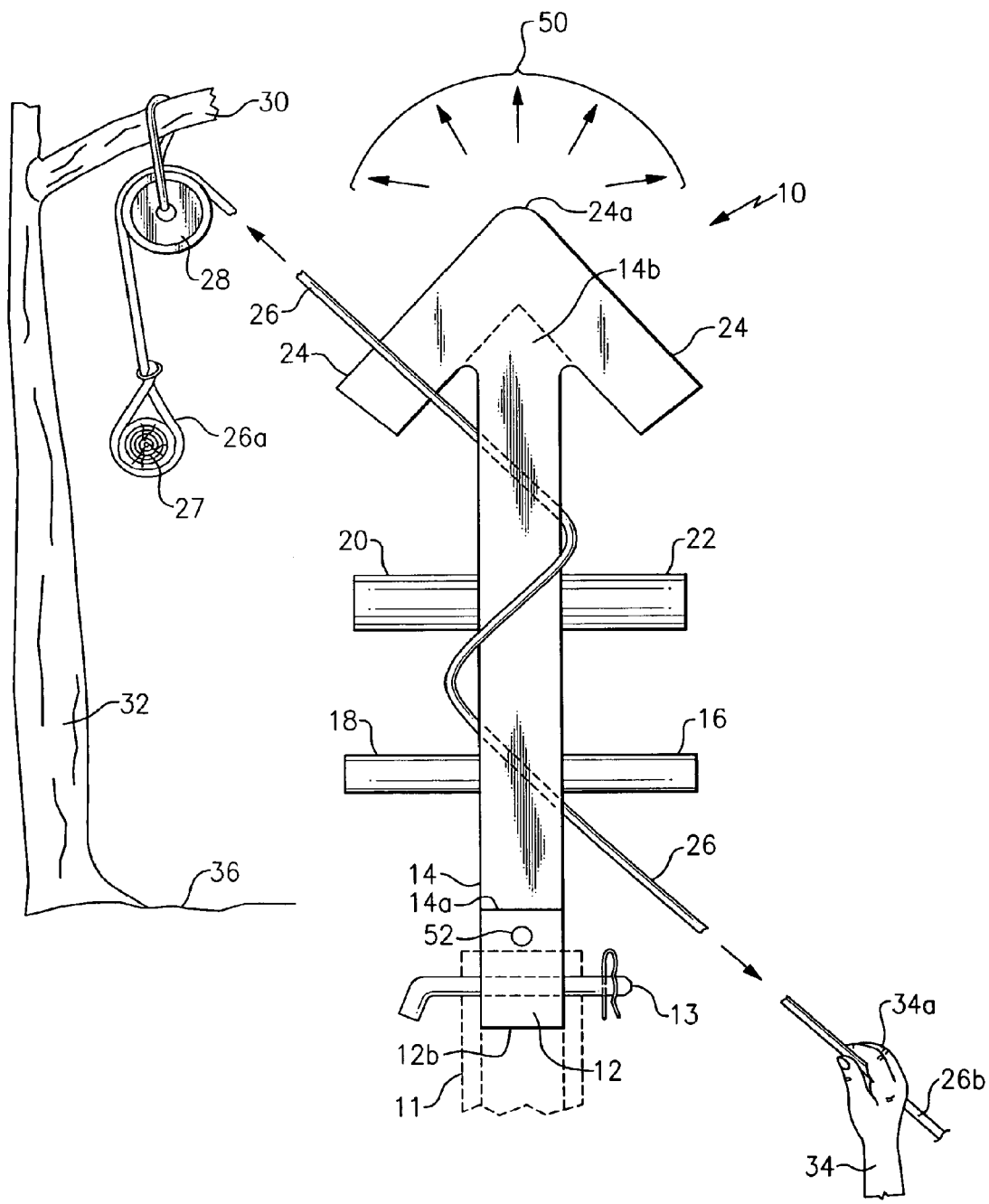
FIG. 1 is a top plan view of a lifting and lowering device in operation, attached to a receiver hitch of a vehicle.

Referring on occasion to both of the FIGURE drawings and now, in particular to FIG. 1, is shown a lifting and lowering device, identified in general, by the reference numeral 10.

The reader will notice that reference is occasionally made throughout the DETAILED DESCRIPTION OF THE INVENTION suggesting that the reader view a particular drawing FIGURE. The suggestion is at times made when the introduction of a new element requires the reader to refer to a different drawing FIGURE and also when the timely viewing of another drawing FIGURE is believed to improve ease of reading or to enhance understanding. To promote optimum understanding of the instant invention the reader is encouraged to periodically refer to each drawing FIGURE.

A top view of a lifting and lowering device 10 is shown in FIG. 1. The lifting and lowering device 10 is attached to a vehicle receiver hitch 11 (which is partially shown in dashed lines). The remainder of the vehicle receiver hitch 11 is attached to a vehicle (not shown), as is well known in the receiver hitch art field.

While a preferred overall shape is shown for the lifting and lowering device 10 of FIG. 1, it is to be understood that many other overall shapes are also possible, after having had benefit of the instant disclosure.

A bottom end 12 of the lifting and lowering device 10 includes a length of two-inch square steel tubing, as is commonly used when attaching to a conventional or standard two-inch (inside dimension) square type of the receiver hitch 11.

Figure 2:
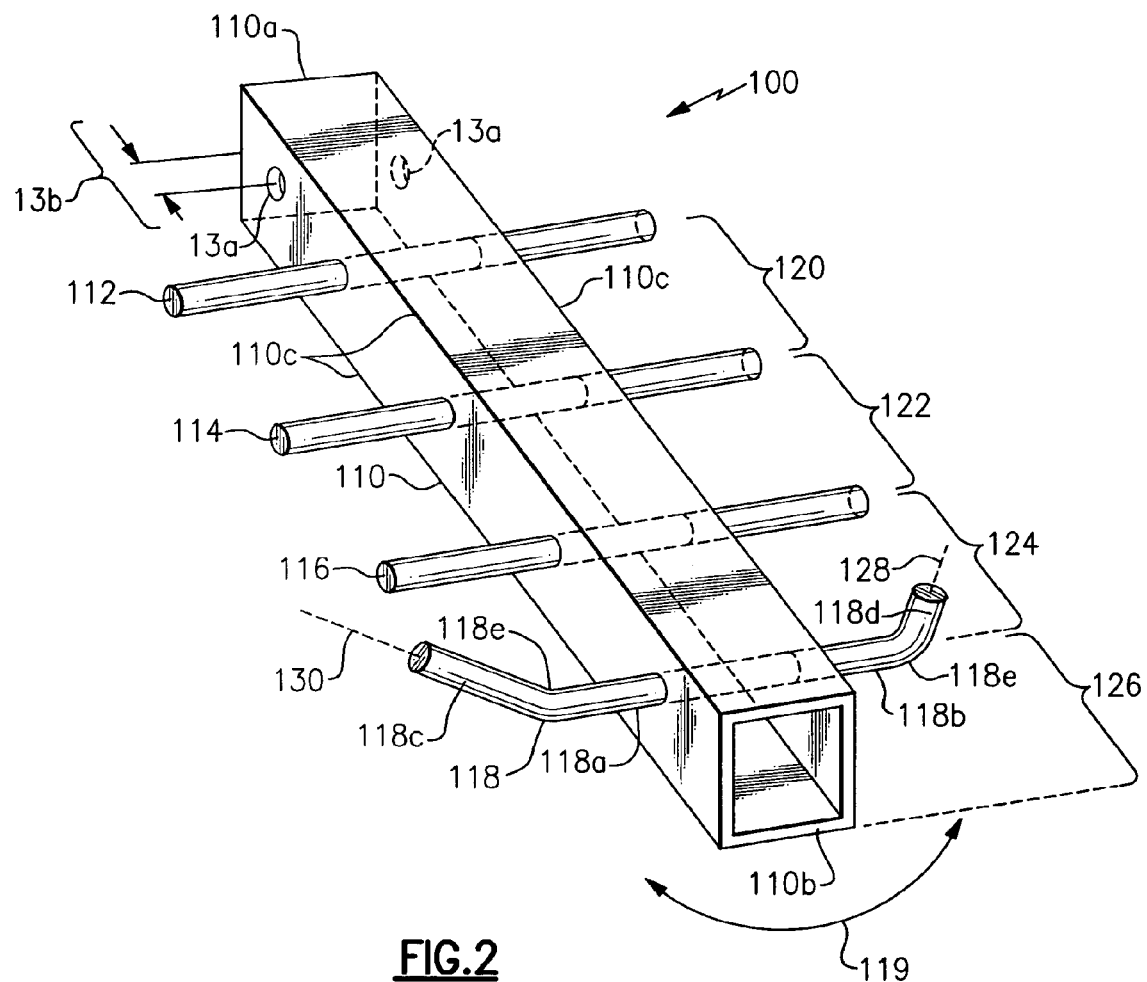
FIG. 2 is a view in perspective of a lifting and lowering device that is structurally similar to that shown in FIG. 1 and which is constructed of different materials.

A hitch pin 13 passes through a well known type of a receiver hitch opening (typically, a standard five-eights diameter hole) that is provided through the receiver hitch 11 and through a pair of corresponding hitch pin openings 13a (See FIG. 2) that is provided through the bottom end 12 of the lifting and lowering device 10. The lifting and lowering device 10 (or embodiment thereof) is inserted a first distance, as shown by bracket 13b (FIG. 3), into the receiver hitch 11 to align the hitch pin openings 13a with the opening provided through the receiver hitch 11. A typical length for the first distance 13b is two and one-half inches from a distal end 12b of the bottom end 12 (FIG. 1) to a centerline of the hitch pin openings 13a. A modified device is shown in FIG. 2 and is described in greater detail hereinafter.

The hitch pin 13 is then inserted through the receiver hitch 11 and through the hitch pin openings 13a to secure the bottom end 12, and therefore the lifting and lowering device 10, to the receiver hitch 11.

A main longitudinal member 14 is attached (welded, most commonly, or by any other preferred means) at a first end 14a thereof to the bottom end 12, as shown in FIG. 1. The main longitudinal member 14 is made of 2 inch round steel, although other material stock may be used.

A first side extension 16 is attached (welded) to the main longitudinal member 14 a predetermined distance away from the bottom end 12. The first side extension 16 extends outward away from the main longitudinal member 14 and is perpendicular to a center longitudinal axis of the main longitudinal member 14 and also generally parallel with a ground surface 36 when the lifting and lowering device 10 is attached to the receiver hitch 11. The main longitudinal member 14 is also generally parallel with the ground surface 36 when the lifting and lowering device 10 is attached to the receiver hitch 11.

A second side extension 18 is similarly attached to an opposite side of the main longitudinal member 14 as compared to the first side extension 16. A centerline of the first side extension 16 aligns with a centerline of the second side extension 18. A third side extension 20 is similarly attached to the main longitudinal member 14 in a spaced-apart parallel relationship as compared to the second side extension 18. A fourth side extension 22 is similarly attached to the main longitudinal member 14 in a spaced-apart parallel relationship as compared to the first side extension 16 and in longitudinal alignment with the third side extension 20. If desired, additional side extensions (not shown) can be included.

The side extensions 16-22 are preferably made of 2 inch or 1 inch round stock, as desired. If desired, the diameter of any of the side extensions 16-22 are varied so that the third and fourth side extensions 20, 22, for example, can be made of 2 inch round stock while the first and second side extensions 16, 18 can be made of 1 inch round stock, or vice-versa.

A nose section 24 is formed of 2 inch round stock and is attached to an opposite second end 14b of the main longitudinal member 14. The nose section 24 is preferably bent to include a generally V-shape with a pointed end 24a disposed maximally away from the bottom end 12. If desired, the nose section 24 can include a T-shape; however, the V-shape is generally preferred and is described in greater detail hereinafter.

During use of the lifting and lowering device 10 a first end 26a of a rope 26 is secured around a severed limb or tree branch 27. The first end 26a is secured to the branch 27 before it is severed (i.e., cut by use of a chain saw) by any of several well known methods or devices that are available for the purpose, as is commonly known in the tree cutting and logging field. The branch 27 can way up to several hundred pounds, or more.

The rope 26 is part of a "block and tackle" and the rope 26 passes over a pulley 28, which is also a part of the block and tackle. The block and tackle is secured to an overhead branch 30 of a tree 32. The rope 26 continues and extends down toward the ground surface 36 where it is wrapped, as desired, around the lifting and lowering device 10. One possible wrapping pattern of an almost infinite number of possible patterns is shown.

A first ground operator 34 uses his hand 34a to grasp the rope 26 at a location of the rope 26 that is disposed proximate an opposite second end 26b of the rope 26 after having first wrapped the rope 26 around the lifting and lowering device 10. It is important to note that the device 10 is attached to a receiver hitch 11 prior to use and that the rope 26 is wrapped around the device 10 prior to completing the cut sufficient to cause a severing of the branch 27. This way, when the branch 27 is severed and able to fall, the friction of the wraps of the rope 26 around the device 10 permit the operator 34 to exert a minimal amount of resistance, thereby tightening the wraps of the rope 26 around the lifting and lowering device 10 and increasing the amount of friction between the rope 26 and the lifting and lowering device 10. The operator 34 is then able to easily and gently lower a several hundred pound object (i.e., the severed branch 27) or an even heavier object.

Otherwise, the operator 34 would have to exert a force approximately equal to the weight of the branch 27 to prevent it from falling. If the branch 27 weighs more than the operator 34, then the lighter operator 34 would be lifted if he/she continued to hold on to the rope 26 while attempting to control the rate of descent of the branch 27 and the branch 27 would fall suddenly and out of control while the operator 34 was lifted equally as fast.

During use the operator 34 would typically include more wraps of rope 26 around the lifting and lowering device 10 than necessary to control the descent of even a very heavy type of the branch 27. By wrapping the rope 26 around any of the side extensions 16-22 to include at least 360 degrees of wrap around any one (or more than one) of the side extensions 16-22 any desired amount of friction can be provided.

After severing, the operator 34 would first verify that the branch 27 can be maintained in position and the operator 34 would then slowly unwind the rope 26, one-half wrap at a time, as needed to decrease friction enough to permit the branch 27 to descend. If the friction is sufficiently high the branch 27 will not descend even if the operator 34 does not provide any additional resistance (i.e., force). With each unwrapping motion the operator 34 would pause to verify that it was still easy to control the descent of the branch 27.

The operator 34 would continue to unwrap the rope 26 from around the lifting and lowering device 10 until the desired lowering resistance was attained (i.e., felt). To control descent of the branch 27, the operator 34 then slowly and progressively feeds the second end 26b of the rope 26 toward the lifting and lowering device 10, as instructed by other crew members (typically by a second ground operator).

In actual use, there would be sufficient rope 26 available to permit the operator 34 to feed the rope 26 toward the lifting and lowering device 10 until the branch 27 was fully lowered to the ground surface 36. In this way, the lifting and lowering device 10 allows the operator 34 to slowly and safely lower the severed branch 27 to the ground surface 36. As mentioned earlier, any desired number of wraps that are accomplished in many different ways are possible to increase or decrease friction between the rope 26 and the lifting and lowering device 10 and thereby control the weight of the severed branch 27.

Care is taken by the operator 34 to remove any slack in the rope 26 between the branch 27 and the lifting and lowering device 10 prior to wrapping the rope 26 around the lifting and lowering device 10. This ensures that control of the branch 27 is present the moment that the branch 27 is severed from the tree 32 and to prevent it from falling, even a short distance, and thereby developing kinetic energy which would increase the magnitude of forces that are experienced. The operator 34 also would take care to ensure that the rope 26 does not pass directly over itself, as this type of friction can damage the rope 26 or cause it to bind.

If desired, the rope 26 (i.e., proximate the second end 26b) can be secured to the lifting and lowering device 10 and a knot can be used to secure the rope 26, at its current position, to the lifting and lowering device 10. If desired, the vehicle is then driven forward which pulls on the rope 26 and raises the severed branch 27. This is useful when it is desirable to raise the severed branch 27 in order to reposition it and either repeat the descent of the branch 27 or attempt to alter the direction or manner of its descent.

Accordingly, the lifting and lowering device 10 is useful for both lifting and lowering objects (i.e., the branch 27 or any other desired object). When lifting is required, the vehicle does all the work. This provides the unexpected benefit of not tiring the operator who would, with other prior art types of devices, have to supply considerable force and work to raise an object. It also allows the lifting and lowering device 10 to be used to tow objects in cooperation with the vehicle or to tow the vehicle, if necessary.

Of course, the device 10 can be used to lower or raise any preferred type of object and the first end 26a of the rope 26 can be modified to support any desired object or load.

It is important to note that the reason the nose section 24 preferably includes a generally V-shape (and not a T-shape) is because the V-shape allows the rope 26 to extend off to either side of the main longitudinal member 14 if the tree 32 and branch 27 are offset to either side.

If a modified nose section (not shown) included a T-shape, the rope 26 could be pulled off of the modified nose section by the weight of the severed branch 27, thereby decreasing friction and putting at risk the ability of the operator 34 to control its rate of descent.

The lifting and lowering device 10 allows the rope 26 to extend anywhere along a 180 degree arc, as shown by a plurality of arrows defined by curved bracket 50. The rope 26 can include any desired vertical angle and can extend along any horizontal angle within 180 degrees of horizontal arc (bracket 50) with respect to the center longitudinal axis of the main longitudinal member 14.

This allows ease of use of the lifting and lowering device 10 by not requiring careful positioning of the vehicle because there is not requirement that the center longitudinal axis of the main longitudinal member 14 point toward the tree 32.

Referring now primarily to FIG. 2, is shown a first modified lifting and lowering device, identified in general by the reference numeral 100. The first modified lifting and lowering device 100 includes a modified first main longitudinal member 110 that is formed, preferably, of a longer length of the same square stock as was used to form the bottom end 12. Therefore, what can be considered functionally to be the equivalent of the bottom end 12 of the lifting and lowering device 10 is included as an integral part of the modified first main longitudinal member 110 and is disposed at a distal end 110a, thereof.

The first modified lifting and lowering device 100 includes any desired number of modified side extensions 112, 114, 116 (three are shown) and a nose extension 118. The nose extension 118 serves a similar purpose as does the nose section 24 by retaining the rope 26 in cooperation with the modified lifting and lowering device 100 when the rope 26 extends at a horizontal angle away from a center longitudinal axis of the modified lifting and lowering device 100.

The modified side extensions 112, 114, 116 and the nose extension 118 are each formed of three-quarter inch solid steel round stock (or other stock, if preferred) and are continuous, thereby each of the modified side extensions 112, 114, 116, and the nose extension 118 extend through openings provided in the modified main longitudinal member 110. The modified side extensions 112, 114, 116 and the nose extension 118 are each attached (welded) to the modified first main longitudinal member 110 after first being centered.

Although any spacing is possible the modified side extensions 112, 114, 116 and the nose extension 118 are each preferably attached on approximately five-inch centers with respect to each adjacent modified extension (112-118) as shown by brackets 120, 122, and 124.

A first modified side extension 112 is the modified side extension (112-116) that is disposed closest to the distal end 110a of the modified first main longitudinal member 110. A preferred distance from the distal end 110a of the modified first main longitudinal member 110 to the first modified side extension 112 is approximately eleven inches to ensure that when the first modified lifting and lowering device 100 is attached to the receiver hitch 11, the first modified side extension 112 is disposed sufficiently far from a rear bumper (such as is found on most trucks, for example) so as to not cause an interference with the bumper during use of the first modified lifting and lowering device 100. Similarly, the first side extension 16 and the second side extension 18 of the lifting and lowering device 10, preferably, also are disposed about eleven inches away from the distal end 12b of the bottom end 12, thereof.

The nose extension 118 includes a desired setback distance, as shown by bracket 126, with respect to an opposite end 110b of the modified first main longitudinal member 110 to maintain sufficient structural integrity for the nose section 118.

The nose extension 118 includes a left first extending portion 118a and a right first extending portion 118b that include a common center longitudinal axis that is parallel with respect to a center longitudinal axis of the modified side extensions 112-116.

The nose extension 118 includes a second left angled extending portion 118c and a second right angled extending portion 118d that are each attached to the left first extending portion 118a and to the right first extending portion 118b, respectively and which include a radius 118e at the point of attachment to introduce an offset to a remaining portion of a pair of center longitudinal axes 128, 130, thereof. The remaining portion of a pair of center longitudinal axes 128, 130, as compared to the center longitudinal axis of the modified extensions 112-116, are each offset by approximately 45 degrees in a direction that directs them in a direction generally closer toward the distal end 110a of the modified first main longitudinal member 110 and, if preferred, closer toward the ground surface 36. The second left angled extending portion 118c and the second right angled extending portion 118d may, if desired, be disposed on same plane as that of the modified side extensions 112-116 but they do not extend upward above that plane and, as previously mentioned, preferably extend below that plane.

In a further embodiment, as described hereinafter and shown in FIG. 3 and FIG. 4, the second left angled extending portion 118c and the second right angled extending portion 118d are preferably disposed on the same plane as that of the modified side extensions 112-116 (i.e. in alignment with a center longitudinal axis of the modified first main longitudinal member 110) because the modified first main longitudinal member 110 of the further embodiment will always point directly toward the pulley 28 during use (i.e., when it is under load).

The second left angled extending portion 118c and the second right angled extending portion 118d and the left first extending portion 118a and the right first extending portion 118b, together, provide a modified nose 118 (i.e., front portion) that permits the rope 26 to extend in a 180 arc along the horizontal plane (90 degrees on either side of a centerline of the modified first main longitudinal member 110) and at any desired upward vertical angle, thereby allowing greater versatility for setup and use of the first modified lifting and lowering device 100. Another advantage of the first modified lifting and lowering device 100 is that it is generally less expensive to manufacture than the lifting and lowering device 10.

The length of the modified side extensions 112, 114, 116 and the nose extension 118 are each a variable. If the length of the modified side extensions 112, 114, 116 are the same and the nose extension 118 is slightly longer, then after including the radius 118e and offset angle for the second left angled extending portion 118c and the second right angled extending portion 118d, the overall assembled length of the modified side extensions 112, 114, 116 and the nose extension 118 would be the same. A preferred length for the modified side extensions 112, 114, 116 is about ten inches which provides for approximately four inches of extension away from the modified first main longitudinal member 110. A preferred length for the nose extension 118 is about twelve inches, which provides a comparable overall assembled length as for the modified side extensions 112, 114, 116 and, therefore, a nearly identical overall width for the first modified lifting and lowering device 100.

During use the nose extension 118 maintains control of the direction of the rope 26. Therefore, it is not expected that the operator 34 would place multiple wraps of the rope 26 around the nose extension 118. The modified side extensions 112, 114, 116 are used to regulate the amount of friction that is experienced by the rope 26 and they will, if desired, experience multiple wraps in any of many possible directions.

The use of round stock for the modified side extensions 112, 114, 116 is preferred, as a uniform amount of friction is generated without creating stress points that could damage the rope 26. It is preferred that the modified first main longitudinal member 110 include radius longitudinal corners 110c to minimize stress from contact with the rope 26 as the rope 26 passes from side to side of the modified first main longitudinal member 110.

It is important to note that the nose extension 118 cannot be properly designed by simply omitting the left first extending portion 118a and the right first extending portion 118b portions and, instead, by extending an overall length for the second left angled extending portion 118c and for the second right angled extending portion 118d while having the second left angled extending portion 118c and the second right angled extending portion 118d extend at the desired rearward and downward angle (at the preferred angle of about 45 degrees or at any other angle) directly away from the modified first main longitudinal member 110. This is because the rope 26 would then be urged under load so that it would directed inward toward the modified first main longitudinal member 110 where it would become pinched and bind between the modified first main longitudinal member 110 and the second left angled extending portion 118c or between the modified first main longitudinal member 110 and the second right angled extending portion 118d. It is important to include at least a short section for the left first extending portion 118a and for the right first extending portion 118b that is perpendicular with respect to the modified first main longitudinal member 110 in order to eliminate the possibility of binding.

Figure 3:
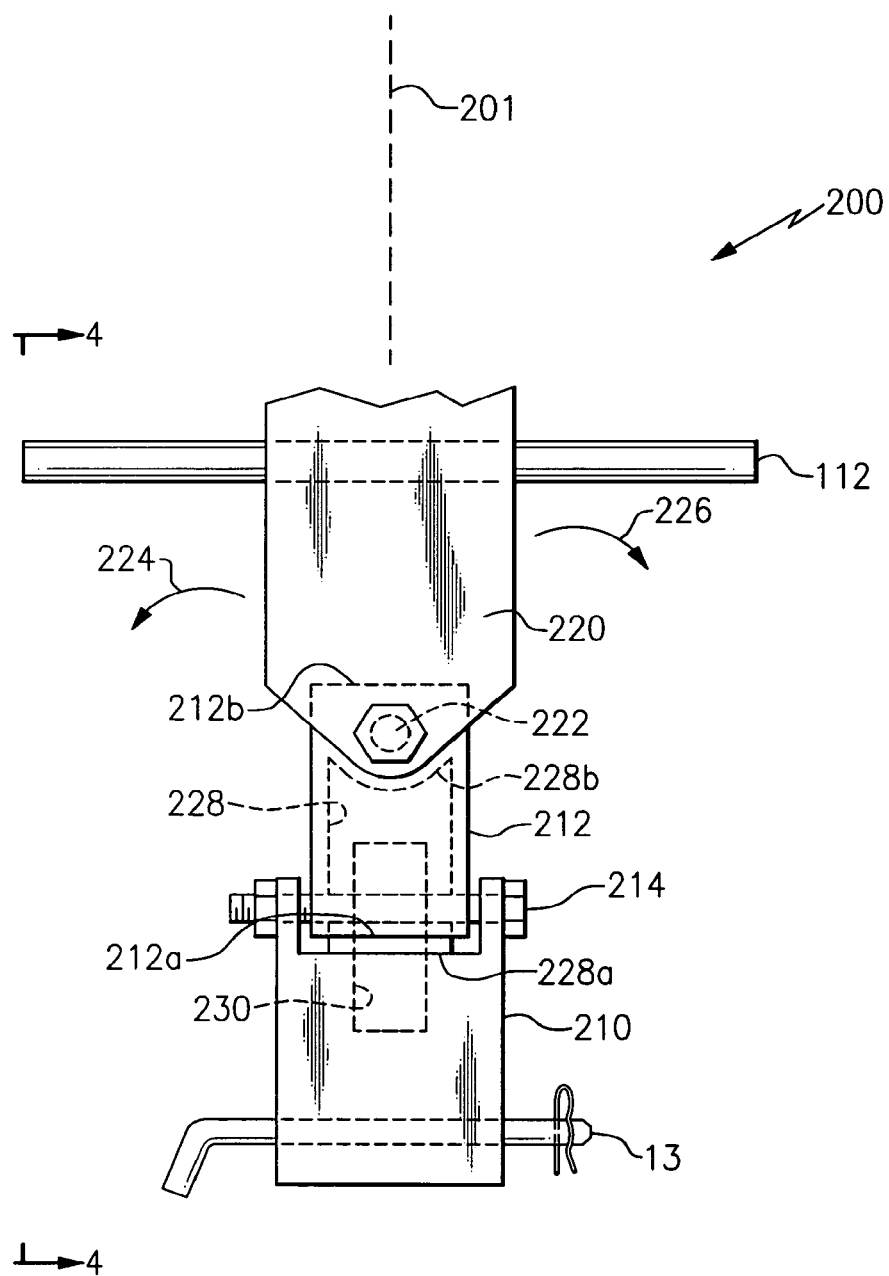
FIG. 3 is a top plan view of a lifting and lowering device as shown in FIG. 2 with a universal joint.
Figure 4:
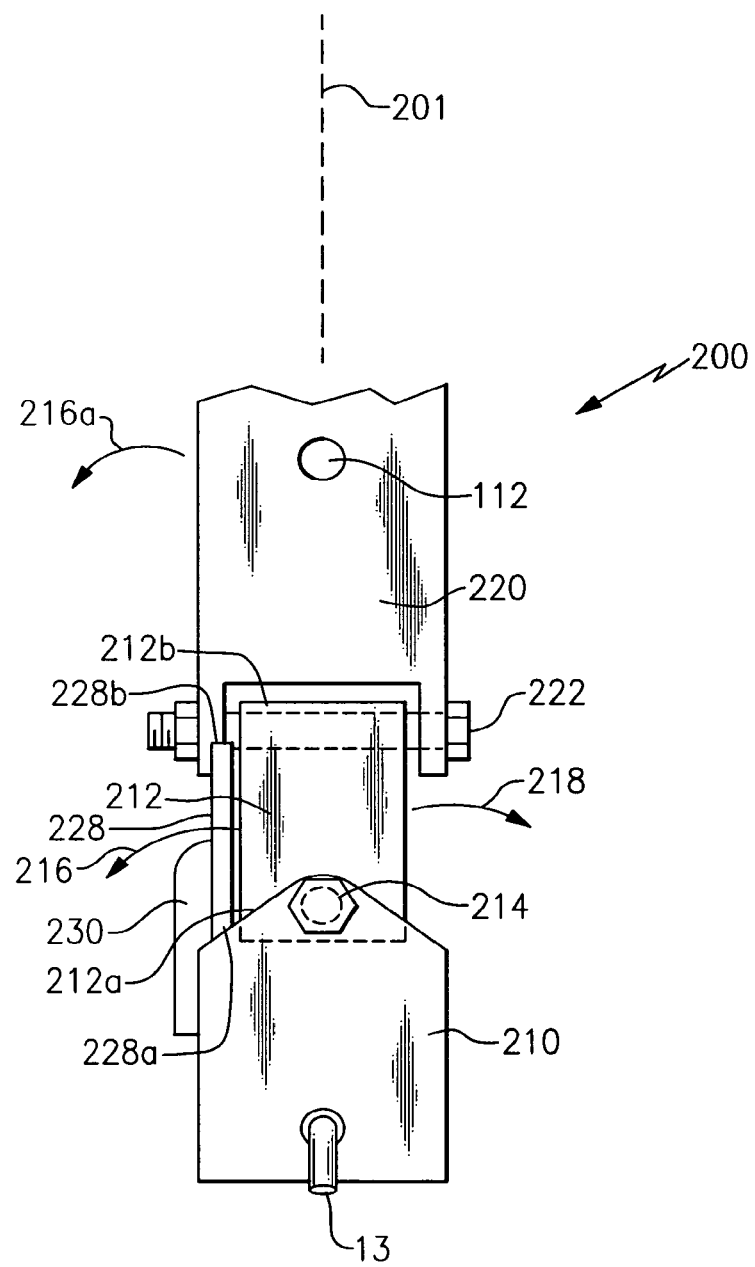
FIG. 4 is a view as shown in FIG. 3 as seen along the lines 4-4 therein.

Referring now to both FIG. 3 and FIG. 4 is shown a second modified lifting and lowering device, identified in general by the reference numeral 200. The second modified lifting and lowering device 200 includes a lower portion that is shown and a remaining upper portion (not shown) that is substantially identical to a comparable upper portion of the first modified lifting and lowering device 100 (which is preferable) or to a comparable upper portion of the lifting and lowering device 10, if desired.

The second modified lifting and lowering device 200 includes a modified bottom end 210 that is inserted into the receiver hitch 11 and attached thereto in a manner, as previously described. A first end 212a of a pivot block 212 is attached to a U-shaped end of the modified bottom end 210 by a lower bolt 214. Accordingly, the pivot block 212 is able to pivot about the axis of the lower bolt 214 in either direction as shown by arrows 216 and 218, but only when a modified center longitudinal axis 201 of a third modified main longitudinal member 220 is elevated above a center longitudinal axis of the receiver hitch 11. This is described in greater detail hereinbelow. The third modified main longitudinal member 220 is substantially similar to the modified first main longitudinal member 110 except for the area of the third modified main longitudinal member 220 that is attached to the pivot block 212.

It is not desirable that any portion of the third modified main longitudinal member 220 should fall below the center longitudinal axis of the receiver hitch 11 as it would appear "droopy" and be in contact with the ground surface 36. This would make access to the third modified main longitudinal member 220 more difficult (i.e., when securing and wrapping the rope 26 around it) and dirt from the ground surface 36 could contaminate and possibly damage the rope 26.

A pivot limiting member 228 is preferably attached to the modified bottom end 210 and is used to prevent the third modified main longitudinal member 220 from pivoting down so that any portion of it is disposed substantially below the center longitudinal axis of the receiver hitch 11. In this way the third modified main longitudinal member 220 is prevented from contacting the ground surface 36. The pivot limiting member 228 is described in greater detail hereinafter.

The pivot block 212 is attached at an opposite second end 212b thereof to a U-shaped end of the third modified main longitudinal member 220 by an upper bolt 222. A center longitudinal axis of the lower bolt 214 is perpendicular with respect to a center longitudinal axis of the upper bolt 222. The third modified main longitudinal member 220 is able to pivot about the axis of the upper bolt 222 in either direction as shown by arrows 224 and 226, but only when the modified center longitudinal axis 201 of the third modified main longitudinal member 220 is elevated above the center longitudinal axis of the receiver hitch 11. This is described in greater detail hereinbelow.

Accordingly, a universal type joint is provided whereby the third modified main longitudinal member 220 is able to pivot in any desired direction during use so that a center longitudinal axis of the third modified main longitudinal member 220 always points in a direction that is generally toward the pulley 28 when the branch 27 is severed and when a load is exerted upon the rope 26 and therefore, upon the third modified main longitudinal member 220.

This allows for optimum efficiency and safety during use because the friction between the rope 26 and the second modified lifting and lowering device 200 is no longer a variable that depends, even slightly, on the direction that the rope 26 extends but is, instead, a constant (if the same wrapping pattern is used) regardless of the direction of the branch 27.

It also always ensures that, during use, the direction that the rope 26 will extend away from the second modified lifting and lowering device 200 in both the horizontal and vertical planes will align with the center longitudinal axis of the third modified main longitudinal member 220. Therefore, there is virtually no possibility of the rope 26 slipping off of the nose extension 118 or off any of the modified side extensions 112-116.

As mentioned earlier, it is desirable that the third modified main longitudinal member 220 not pivot substantially lower than the center longitudinal axis of the receiver hitch 11 during use. If it were to pivot a small amount below the center longitudinal axis of the receiver hitch 11, this would be acceptable. However, the closer the modified center longitudinal axis 201 of the third modified main longitudinal member 220 is maintained with respect to the center longitudinal axis of the receiver hitch 11 (i.e., the closer the modified center longitudinal axis 201 aligns with the center longitudinal axis of the receiver hitch 11) when the second modified lifting and lowering device 200 is not being lifted (urged) in an upward direction by any force supplied by the rope 26, to that extent will the aesthetics of the second modified lifting and lowering device 200 also be enhanced.

When the second modified lifting and lowering device 200 is used to tow an object and, in general, whenever it is attached to the receiver hitch 11 and not in use (i.e., when there is no force attempting to lift the third modified main longitudinal member 220 upward or toward either side) it is desirable that the modified center longitudinal axis 201 of the third modified main longitudinal member 220 align as closely as possible with the center longitudinal axis of the receiver hitch 11. This is accomplished by the pivot limiting member 228.

The pivot limiting member 228 is attached at a first end 228a thereof to the modified bottom end 210 and, if preferred, the pivot limiting member 228 can be included as an integral part and extension of the modified bottom end 210. The pivot limiting member 228 extends forward from the modified bottom end 210 and under the pivot block 212. If desired, a gusset plate 230 can be attached to an underside of the pivot limiting member 228 and to an underside of the pivot block 212 which, if included, is used to provide increased strength for the pivot limiting member 228 to support the weight of the third modified main longitudinal member 220, as explained below.

As can be observed, the pivot limiting member 228 provides a plane that is parallel with a plane of the modified bottom end 210 and, when attached to the receiver hitch 11, with the plane of the receiver hitch 11. Therefore, when the pivot block 212 pivots downward in the direction of arrow 216, it eventually contacts the upper surface of the pivot limiting member 228, which then limits its movement in the direction of arrow 216. Accordingly, the pivot block 212 cannot pivot lower than parallel with the receiver hitch 11. The pivot block 212 is able to pivot higher than the plane of the pivot limiting member 228 and will do so whenever an upward or lifting force is applied to the third modified main longitudinal member 220 by the rope 26 and weight of the branch 27.

The third modified main longitudinal member 220 is preventing from pivoting in a downward direction as shown by arrow 216a (FIG. 4) with respect to the pivot block 212 by the upper bolt 222 and also in a direction opposite that shown by arrow 216a. The third modified main longitudinal member 220 can only pivot around the axis of the upper bolt 222, which constitutes side-to-side swing, again as shown by arrows 224 and 226. Therefore, by preventing the pivot block 212 from pivoting any further downward in the direction of arrow 216 than parallel with the plane of the receiver hitch 11, the pivot limiting member 228 also prevents the third modified main longitudinal member 220 from pivoting further downward in the direction of arrow 216 than parallel with the plane of the receiver hitch 11.

The pivot limiting member 228 includes an opposite second end 228b that is distally disposed with respect to the first end 228a, thereof. The second end 228b of the pivot limiting member 228 includes a generally V-shape (see dashed lines, FIG. 3) that bears against a portion of an underside of the third modified main longitudinal member 220 which is disposed proximate the upper bolt 222.

The portion of the underside of the third modified main longitudinal member 220 comes in contact with the generally V-shape of the second end 228b whenever the third modified main longitudinal member 220 and the pivot block 212 are disposed in a maximally downward orientation so that the modified center longitudinal axis 201 aligns with a center longitudinal axis of the modified bottom end 210 and with the center longitudinal axis of the receiver hitch 11. The portion of the underside of the third modified main longitudinal member 220 that comes in contact with the generally V-shape of the second end 228b has an identical shape with respect to a corresponding upper portion of the third modified longitudinal member 220, as shown in FIG. 3.

The V-shape of the second end 228b corresponds with the shape of the underside of the third modified main longitudinal member 220. Therefore, the V-shape of the second end 228b prevents the third modified longitudinal member 220 from pivoting to the side, either in the direction as shown by arrow 224 or by arrow 226 when the third modified main longitudinal member 220 and the pivot block 212 are disposed in the maximally downward orientation.

If desired, the V-shape of the second end 228b could be extended beyond the dimensions of the pivot block 212 and along a greater portion of the third modified main longitudinal member 220 and closer toward the modified first side extension 112, thereof. This would ensure that there was even less side-to-side play between the third modified main longitudinal member 220 and the second end 228b of the pivot limiting member 228 when the pivot block 212 and the third modified main longitudinal members 220 were disposed in their maximum respective downward positions.

In this way, the center longitudinal axis 201 of the third modified main longitudinal member 220 is made to align with the center longitudinal axis of the receiver hitch 11 whenever the pivot block 212 and the third modified main longitudinal member 220 are disposed maximally downward. As soon as the rope 26 is wrapped around the nose extension 118 and any of the modified side extensions 112-116 and the rope 26 is pulled by the operator 34 to tighten it, a force will be exerted upon the nose extension 118 that will tend to lift the nose extension 118, and therefore lift the third modified main longitudinal member 220 in an upward direction.

As soon as the third modified main longitudinal member 220 has been elevated above its position of cooperation with the pivot limiting member 228, the third modified main longitudinal member 220 will swing toward either side as shown by arrows 224 and 226, as required to orient the center longitudinal axis of the third modified main longitudinal member 220 so that it aligns substantially with an axis of the rope 26 and points generally toward the pulley 28.

Accordingly, the second modified lifting and lowering device 200 is maintained in a level orientation and in alignment with the longitudinal axis of the receiver hitch 11 when it is not subject to a vertical component load, as shown in FIG. 1. When a load is applied that includes a vertical component (i.e., when the force applied to the third modified main longitudinal member 220 comes from a direction that is elevated above the plane of the third modified main longitudinal member 220), the second modified lifting and lowering device 200 first rises slightly and then is able to swing, as required, toward either side so that it attains the proper horizontal vector and vertical vector and is able to point (i.e., the center longitudinal axis of the third modified main longitudinal member 220) toward the pulley 28. The provides optimum safety during use because it ensures that there is no force applied to the rope 26 that would tend to urge the rope 26 off of the nose extension 118.

Referring again to FIG. 1, an additional hole 52 is optionally provided through the bottom end 12 (or through the modified bottom end 210 or through the modified first main longitudinal member 110) and is perpendicular with respect to the centerline of the hitch pin 13, as shown. The additional hole 52 provides an alternate opening for attachment of the hitch pin 13 and is described in greater detail hereinafter.

Figure 5:
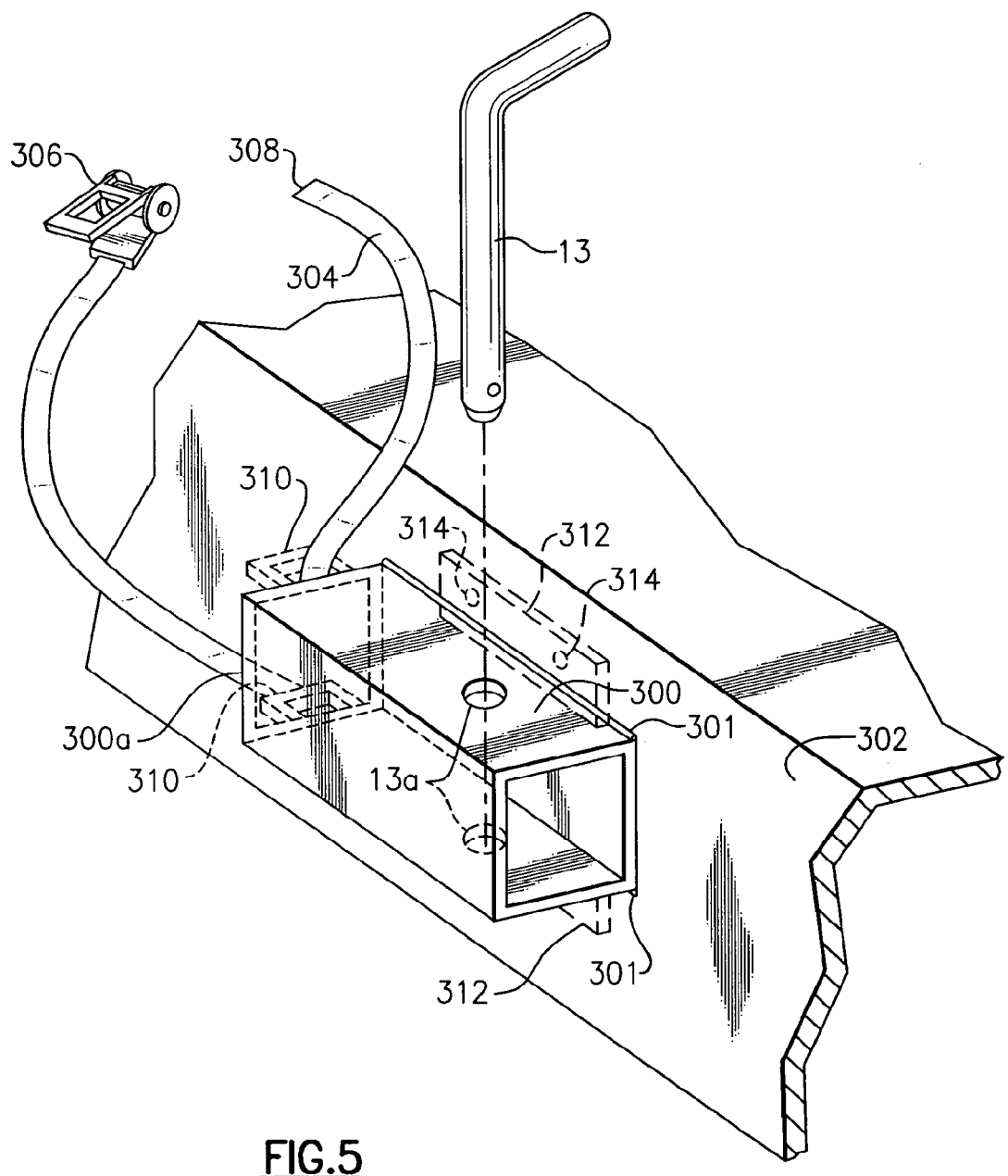
FIG. 5 is a view in perspective of an optional remote receiver.

An optional remote receiver 300 (FIG. 5) is attached by a weld 301 (or other means) at a desired location to an object 302, such as to a heavy piece of equipment, front or rear bumper of a vehicle, or side of a vehicle, tractor, a second (i.e., distal) tree (not shown) that is disposed a preferred distance away from the tree 32, or to any other preferred secure object in order to provide an alternate anchor point (or points) for attachment thereto of any version of the lifting and lowering device 10, 100, 200. This is because it is not always possible to maneuver the vehicle with the receiver hitch 11 to the work location.

If desired, the remote receiver 300 is slightly modified for attached to the second tree or to the preferred type of object to accommodate a strap 304. The strap 304 can include a type of ratchet mechanism 306 or any other preferred means for securing a strap end 308 and adjusting the overall length of the strap 304 as it passes around the distal tree or object. A pair of strap loops 310 (dashed lines) are optionally included with the remote receiver 300. The strap loops are preferably attached to the remote receiver 300 at a distal end 300a of the remote receiver 300. The distal end 300a is disposed at an opposite longitudinal end of the remote receiver 300 as where the hitch pin openings 13a are located. The strap 304 passes through the strap loops 310 and around the distal tree or object. Excess slack is removed from the strap 304 and the strap end 308 is secured to the ratchet mechanism 306. In this way the remote receiver 300 can easily be detachably-attached (i.e., secured to) to the second tree or any preferred object.

Accordingly, any version of the lifting and lowering device 10, 100, 200 can be secured to the remote receiver 300, which in turn, can then be secured to the distal tree or to the object 302 by the strap 304. By use of the strap 304 (instead of welding) and the by positioning the strap loops 310 at the distal end 300a of the remote receiver 300, it is ensured that, during use, the bottom end (12b, 110a, 210) of the lifting and lowering device 10, 100, 200 will be disposed closest toward the distal tree or the object 302 and that the main longitudinal portion of the lifting and lowering device 10, 100, 200 will orient itself (when under load) so that the center longitudinal axis of the lifting and lowering device 10, 100, 200 will point generally in a direction toward the pulley 28 and in parallel alignment with respect to the longitudinal axis of the rope 26. This position provides maximum safety because it reduces to a minimum any possibility that the rope 26 can inadvertently slip from its position of cooperation with the lifting and lowering device 10, 100, 200.

The additional hole 52 is used to properly orient the lifting and lowering device 10, 200, 300, if necessary, when it is attached to the remote receiver 300 and when the remote receiver 300 is attached to the object 302 by welding or, as described below, by bolting. Because the remote receiver 300, when attached to the object 302, may be rotated about its center longitudinal axis by 90 degrees with respect to the normal orientation of the receiver hitch 11 that is attached to the vehicle, the additional hole 52 is similarly rotated by 90 degrees to permit proper (i.e. right-side up) orientation of any version of the lifting and lowering device 10, 200, 300 when it is attached to the remote receiver 300. The remote receiver 300 includes any preferred length and is preferably made of the same rectangular tubing size and type of material stock as is the receiver hitch 11.

If desired, a plurality of mounting side members 312 can be included along a lower plane of the remote receiver 300 and welded to opposite sides of the remote receiver 300. Bolt holes 314 would then be provided through the side members 312 to permit bolting (instead of welding) the remote receiver 300 to the object 302. This would permit attachment to and, when desired, detachment of the remote receiver 300 from the object 302.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A lifting and lowering device and system for use with a receiver hitch, comprising:
   (a) means for detachably-attaching said device to said receiver hitch;
   (b) a main longitudinal member that includes a first end and an opposite second end, and wherein said main longitudinal member is attached to said means for detachably-attaching said device to said receiver hitch, and wherein said first end of said main longitudinal member is disposed at an end of said main longitudinal member that is proximate to said means for detachably-attaching said device to said receiver hitch; and
   c) at least two members that are attached to said main longitudinal member and which extend in a direction that is generally away from said main longitudinal member and wherein said at least two members are disposed in a substantially horizontal plane when said device is properly secured to said receiver hitch; and including means disposed proximate said first end of said main longitudinal member to permit said main longitudinal member to pivot vertically upward with respect to a center longitudinal axis of said receiver hitch, and wherein said main longitudinal member is prevented from pivoting in a downward direction below said center longitudinal axis when said means for detachably-attaching said device to said receiver hitch is fully inserted in said receiver hitch, and wherein when said means for detachably-attaching said device to said receiver hitch is fully inserted in said receiver hitch, said main longitudinal member is able to pivot horizontally with respect to said center longitudinal axis.

2. The lifting and lowering device and system of claim 1 wherein said at least two members include a nose portion that is disposed proximate a front of said device and at least one side extension, wherein said at least one side extension is disposed between said nose portion and said first end of said main longitudinal member.

3. The lifting and lowering device and system of claim 2 wherein said at least one side extension includes at least two side extensions, and wherein said at least two side extensions are disposed on opposite sides of said main longitudinal member.

4. The lifting and lowering device and system of claim 2 wherein said nose portion includes a nose member having a generally V-shape, and wherein a first portion of said nose member is disposed on a first side of said main longitudinal member and a second portion of said nose member is disposed on an opposite side of main longitudinal member.

5. The lifting and lowering device and system of claim 2 wherein said nose portion is formed of a continuous piece of round stock, and wherein said nose portion extends through openings provided on opposite ends of said main longitudinal member.

6. The lifting and lowering device and system of claim 5 wherein said nose portion includes a left first extending portion that extends from a first side of said main longitudinal member and a right first extending portion that extends from an opposite second side of said main longitudinal member, and wherein a center longitudinal axis of said left first extending portion and said right first extending portion is in parallel alignment with respect to a center longitudinal axis of said at least one side extension.

7. The lifting and lowering device and system of claim 6 including a second left angled extending portion that is attached to said left first extending portion and a radius that is disposed there-between and a second right angled extending portion that is attached to said right first extending portion and a radius that is disposed there-between, and wherein a center longitudinal axis of said second left angled extending portion and wherein a center longitudinal axis of said second right angled extending portion are not in alignment with respect to said center longitudinal axis of said left first extending portion and said right first extending portion.

8. The lifting and lowering device and system of claim 1 wherein said at least two members are formed of a round material stock.

9. The lifting and lowering device and system of claim 1 wherein said at least two members include a nose portion that is disposed proximate a front of said device and a plurality of side extensions, wherein said plurality of side extensions are disposed between said nose portion and said first end of said main longitudinal member, and wherein each of said plurality of side extensions are disposed in a spaced apart and parallel orientation with respect to each other and with respect to at least a portion of said nose portion.

10. The lifting and lowering device and system of claim 1 wherein said at least two members include at least two side extensions, and wherein said at least two side extensions are disposed on the same side of said main longitudinal member and in a parallel and spaced-apart orientation with respect to each other and between said first end and said second end of said main longitudinal member.

11. The lifting and lowering device and system of claim 1 wherein said at least two members include at least two side extensions, and wherein said at least two side extensions are disposed on opposite sides of said main longitudinal member and wherein said at least two side extensions are disposed in axial alignment with respect to each other.

12. The lifting and lowering device and system of claim 11 wherein said at least two side extensions are formed of a contiguous material that passes through a pair of openings provided in opposite sides of said main longitudinal member, and wherein said contiguous material is centered with respect to said main longitudinal member and attached to said main longitudinal member, and wherein a first of said at least two side extensions is disposed on and extends from a first side of said opposite sides of said main longitudinal member and wherein a second of said at least two side extensions is disposed on and extends from an opposite second side of said main longitudinal member.

13. The lifting and lowering device and system of claim 12 wherein said at least two side extensions include at least four side extensions and wherein each pair of said at least four side extensions are formed of a contiguous material that passes through corresponding pairs of openings provided in opposite sides of said main longitudinal member, and wherein each pair of said at least four side extensions are disposed in a parallel and spaced-apart orientation with respect to each other and between said first end and said second end of said main longitudinal member.

14. The lifting and lowering device and system of claim 1 wherein at least a portion of said main longitudinal member is formed of rectangular stock.

15. The lifting and lowering device and system of claim 1 wherein at least a portion of said main longitudinal member is formed of round stock.

16. The lifting and lowering device and system of claim 1 including a remote receiver and wherein said remote receiver includes means for attaching said remote receiver to an object, and wherein said lifting and lowering device is detachably-attachable with respect to said remote receiver.

17. A lifting and lowering device and system for use with a receiver hitch, comprising:

(a) means for detachably-attaching said device to said receiver hitch;

(b) a main longitudinal member that includes a first end and an opposite second end, and wherein said main longitudinal member is attached to said means for detachably-attaching said device to said receiver hitch, and wherein said first end of said main longitudinal member is disposed at an end of said main longitudinal member that is proximate to said means for detachably-attaching said device to said receiver hitch;

c) at least two members that are attached to said main longitudinal member and which extend in a direction that is generally away from said main longitudinal member and wherein said at least two members are disposed in a substantially horizontal plane when said device is properly secured to said receiver hitch, and wherein at least one of said at least two members includes at least a portion thereof that includes a center longitudinal axis that is disposed at an angle that is less than ninety degrees with respect to a center longitudinal axis of said main longitudinal member, and wherein said angle is measured from said main longitudinal member proximate said first end of said main longitudinal member to said center longitudinal axis of said at least one of said at least two members and wherein, when a rope that is attached to an object at a first end of said rope is disposed around said at least a portion of said one of said at least two members, a force applied by a weight of said object applies a force to said rope and to said one of said at least two members that urges said rope toward said main longitudinal member; and including means disposed proximate said first end of said main longitudinal member to permit said main longitudinal member to pivot vertically upward with respect to a center longitudinal axis of said receiver hitch, and wherein said main longitudinal member is prevented from pivoting in a downward direction below said center longitudinal axis when said means for detachably-attaching said device to said receiver hitch is fully inserted in said receiver hitch, and wherein when said means for detachably-attaching said device to said receiver hitch is fully inserted in said receiver hitch said main longitudinal member is able to pivot horizontally with respect to said center longitudinal axis.

* * * * *